United States Patent
Jensen et al.

(10) Patent No.: US 11,656,338 B2
(45) Date of Patent: May 23, 2023

(54) RETROREFLECTOR WITH SENSOR

(71) Applicant: HEXAGON TECHNOLOGY CENTER GMBH, Heerbrugg (CH)

(72) Inventors: Thomas Jensen, Rorschach (CH); Andreas Schwendener, Chur (CH); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 764 days.

(21) Appl. No.: 16/576,699

(22) Filed: Sep. 19, 2019

(65) Prior Publication Data
US 2020/0096610 A1    Mar. 26, 2020

(30) Foreign Application Priority Data
Sep. 20, 2018  (EP) ..................... 18195690

(51) Int. Cl.
*G01S 7/00* (2006.01)
*G01S 7/481* (2006.01)
*G01S 7/499* (2006.01)
*G01S 17/08* (2006.01)

(52) U.S. Cl.
CPC .............. *G01S 7/481* (2013.01); *G01S 7/499* (2013.01); *G01S 17/08* (2013.01)

(58) Field of Classification Search
CPC ........... G01S 7/481; G01S 7/499; G01S 17/08
See application file for complete search history.

(56) References Cited

U.S. PATENT DOCUMENTS

| | | |
|---|---|---|
| 4,814,628 A | 3/1989 | Eichweber |
| 6,420,694 B1 | 7/2002 | Greenwood |
| 2008/0229592 A1* | 9/2008 | Hinderling ............. G01C 15/06 359/834 |
| 2013/0329218 A1 | 12/2013 | Vogel |
| 2014/0198207 A1 | 7/2014 | Lippuner |
| 2014/0307252 A1 | 10/2014 | Hinderling et al. |
| 2014/0320643 A1 | 10/2014 | Markendorf |
| 2015/0247927 A1* | 9/2015 | Bockem .................. G01S 7/481 356/3.09 |

(Continued)

FOREIGN PATENT DOCUMENTS

| CN | 103069252 A | 4/2013 |
|---|---|---|
| CN | 103487039 A | 1/2014 |

(Continued)

OTHER PUBLICATIONS

European Search Report dated Mar. 18, 2019 for European Application No. 18195690.5.

*Primary Examiner* — Zhihan Zhou
(74) *Attorney, Agent, or Firm* — Maschoff Brennan (57) ABSTRACT

A reflector arrangement having at least one retroreflector and at least one sensor arrangement arranged downstream of the retroreflector in relation to a beam incidence direction, having a sensor. The sensor arrangement comprises a code element—having a code pattern, and the retroreflector, the code element—and the sensor are arranged in such a way that the code element—is arranged between the retroreflector and the sensor and an angle-dependent position with respect to the optical axis of a projection of the code pattern onto the detection surface can be determined by means of the sensor.

12 Claims, 2 Drawing Sheets

(56) References Cited

U.S. PATENT DOCUMENTS

2015/0253137 A1* 9/2015 Jensen ................. G01C 15/006
  356/4.01
2017/0115497 A1* 4/2017 Chen .................... H04N 13/207

FOREIGN PATENT DOCUMENTS

| | | |
|---|---|---|
| CN | 103959090 A | 7/2014 |
| CN | 104101335 A | 10/2014 |
| DE | 3709142 A1 | 9/1988 |
| EP | 1 200 853 B1 | 5/2002 |
| EP | 1 686 350 A1 | 8/2006 |
| EP | 1734336 A1 | 12/2006 |
| EP | 2916104 A1 | 9/2015 |

* cited by examiner

RETROREFLECTOR WITH SENSOR

CROSS-REFERENCE TO RELATED APPLICATIONS

This application claims priority to European Patent Application No. 18195690.5 filed on Sep. 20, 2018, which is incorporated herein by reference.

FIELD OF THE INVENTION

The invention relates to a reflector arrangement, preferably for use in the field of geodetic surveying, which provides a determination of its own orientation relative to a surveying apparatus.

BACKGROUND

Surveying systems for determining positions in the field of geodesy or the field of building or construction are diversely known. Examples thereof are systems consisting of a static surveying apparatus having a direction and range meter, for example a total station, and a measuring aid instrument, for example a plumb rod, marking a point to be surveyed or to be characterized. A geodetic measuring device of the prior art is described, for example, in the publication document EP 1 686 350. Layout systems are also known, consisting of a static laser emitter, which by means of a laser beam generates a position reference that can be received by a laser receiver at the point to be marked. Surveying activities are thus carried out by the interaction of a static apparatus, having a known location and therefore offering a position reference, with a receiving or marking, or targetable, measuring aid means, so that the position of individual terrain points such as land surveying points or points on construction site objects, for example in the interior or exterior region of buildings or in road construction, can be determined accurately with a view to position measurement or setting-out.

With respect to the configuration of the surveying apparatuses, numerous different embodiments are known. For example, modern total stations have microprocessors for digital postprocessing and storage of recorded measurement data. The apparatuses generally have a compact and integrated design, there usually being coaxial distance measuring elements as well as computation, control and storage units in an apparatus. Depending on the level of development of the total station, motorization of the targeting or sighting device and—in the case of using retroreflectors (for instance an all-round prism) as target objects—means for automatic target searching and tracking may furthermore be integrated. As a man-machine interface, the total station may comprise an electronic display/control unit—generally a microprocessor computation unit with an electronic data memory means—having a display and input means, for example a keypad. The display/control unit is supplied with the measurement data recorded by electrical sensors, so that the position of the target point can be determined, optically displayed and stored by the display/control unit. Total stations known from the prior art may furthermore have a radio data interface for setting up a radio link to external peripheral components, for example to the measurement aid instrument or to a hand-holdable data recording apparatus, which may for example be configured as a data logger or field computer.

In order to sight or target the target point to be surveyed, geodetic surveying apparatuses of the generic type comprise a target telescope, for example an optical telescope, as a sighting device. The target telescope is generally rotatable about a vertical upright axis and a horizontal tilt axis relative to a base of the measuring apparatus, so that the telescope can be aligned with the point to be measured by swiveling and tilting. In addition to the optical viewing channel, modern apparatuses may comprise a camera for recording an image, integrated into the target telescope and for example aligned coaxially or parallel, in which case the recorded image may in particular be represented as a live image on the display of the display/control unit and/or on a display of the peripheral apparatus—for example the data logger—used for remote control.

Current surveying apparatuses by now comprise an automatic target tracking function for prisms used as a target reflector (ATR: "Automatic Target Recognition") as standard. To this end, for example, a further separate ATR light source and a special ATR detector (for example a CCD surface sensor) sensitive to this wavelength are additionally integrated in the telescope.

In many geodetic applications, surveying of points is carried out by placing a specially configured measuring aid instrument or target objects (for example surveying rods) at the target point. This usually consists of a plumb stick with a reflector (for example an all-round prism) for definition of the measurement path, or of the measurement point. For such surveying tasks, data, instructions, speech and further information items are typically transmitted between the target object and the central measuring apparatus in order to control the measurement process and in order to establish or register measurement parameters. Examples of such data are identification information items for the target object (from example of the type of prism used), the inclination of the plumb stick, the height of the reflector above the ground, reflector constants or measurement values such as temperature or air pressure. These information items, or situation-contingent parameters are required in order to allow highly precise targeting and surveying of the measurement point defined by the plumb rod with a prism.

In addition, determination of the spatial orientation or an inclination relative to respectively relevant spatial directions of the respective aid instrument is required or to be adjusted in a defined way (for example vertically), in order together with the determined position of the reflector arranged on the aid instrument to derive the measurement point to be determined by means of the instrument. Such orientation may, for example, be determined by means of an inclination sensor which is provided in a determined position and placement relative to the reflector.

The use of inclination sensors allows simple position determination in two rotational degrees of freedom. In this way, a roll and a pitch of the measuring aid instrument, i.e. a respective rotation about a respective horizontal axis, may be determined. Technically more complexly configured, however, is the determination of a third spatial direction, a rotation about a vertical axis, for example the longitudinal axis of the plumb stick, the so-called yaw of the measuring aid instrument.

To this end, solutions by means of additional devices on the part of the measuring instrument are known from the prior art. The respective device is in this case, for example, illuminated by the total station etc. and the yaw angle may also be deduced with the aid of an angle of incidence or imaging of a code. Such solutions are, for example, known from EP 2 916 104 A1.

A disadvantage with such solutions is that, in addition to the reflector typically present, at least one further component is provided on the measuring aid instrument and there is therefore increased complexity in relation to the configuration of such instruments, and/or the instruments have a relatively large spatial extent. A recording angle which can thereby be provided, i.e. the possible measurement range, is limited because of the arrangement. Furthermore, determination of the orientation, particularly in relation to the use of inclination sensors, is achievable only in the scope of the respective limited sensor accuracy. Furthermore, the additional components respectively entail additional error sources in relation to the determination of position and orientation (for example, an undetermined angle offset of the inclination sensor relative to the reflector due to mechanical loading leads to lower accuracy, or vitiated values).

A solution according to EP 1 200 853, in which a prism has a small passage opening for the measurement beam and the latter partially strikes a sensor directly (in a similar way as in the imaging of a pinhole camera) also has considerable disadvantages in relation to achievable accuracies. Precise determination of the position of the radiation on the sensor is achieved only with great restriction, since this determination accuracy depends crucially on the measurement distance, the beam quality and the environmental conditions (fog, rain, dust). Slight fouling, for example even in the form of a fingerprint on the outer surface of the prism, may lead to asymmetrical imaging or displacement of the radiation transmitted through the small opening on the sensor and therefore to a measurement error during the evaluation, for example by means of a threshold value-based centroid determination. Since only a single very small spot is evaluated, corresponding error influences are virtually undetectable and lead to greatly restricted robustness for measurements in the outdoor field. Furthermore, in the case of a distance measurement to this unit, considerable measurement errors in the distance measurement to this unit may occur because of structurally induced reflections internal to the reflector.

SUMMARY

It is therefore an object of some embodiments of the present invention to provide an improved compact device which allows more reliable and more accurate orientation determination, in particular with up to three degrees of freedom (three rotational degrees of freedom), for surveying purposes. In particular, the intention is to provide more reliable and more accurate position determination in up to six degrees of freedom, in three translational and in three rotational degrees of freedom.

This object is achieved by implementation of the characterizing features of the independent claims. Features which refine the invention in an alternative or advantageous way may be found in the dependent patent claims.

Some aspects of the invention are based on the idea of incidence angle-correlated detection of the position of a code projection, which can be generated by electromagnetic radiation entering a reflector.

Some aspects of the invention relate to a reflector arrangement for position determination and/or marking target points, in particular for industrial or geodetic surveying. The reflector arrangement comprises at least one retroreflector, which provides position determination for the reflector arrangement by means of parallel, in particular coaxial beam reflection and a passage surface for at least a part of radiation entering the retroreflector.

As a retroreflector in geodetic surveying, triple prisms or triple mirrors are typically used, which provide a corresponding parallel beam reflection. If the reflector is targeted with a surveying apparatus, the measurement beam is reflected back to the surveying apparatus and, with the aid of the signal thus recordable at the surveying apparatus, the distance to the reflector can be determined, for example by means of time-of-flight calculation. A part, in particular a negligibly small part, of the total measurement radiation cross section may pass through the reflector provided according to the invention and is not reflected back. The passage surface provided therefor may, for example, be produced by cutting off a corner of a triple prism.

The reflector arrangement furthermore comprises at least one sensor arrangement, arranged downstream of the retroreflector in relation to a beam incidence direction, having a sensor for recording radiation passing through the passage surface, the sensor defining an optical axis oriented orthogonally with respect to its detection surface.

The sensor may, for example, be configured as a global-shutter or as a rolling-shutter sensor. The resolution in this case corresponds at least to VGA, there being an image frequency at full resolution of at least 20 Hz, in particular at least 50 Hz. The sensor may be configured as a CCD or CMOS, optionally as a linear or surface sensor. When using a 2D sensor (surface sensor), a small field of view is obtained per pixel, so that less background light is recorded and the signal-to-noise ratio is improved. With a 1D sensor (linear sensor), more rapid data recording may be carried out.

The sensor may furthermore be configured as a backside illumination sensor (as an alternative to front-side illumination). With such a sensor type, a relatively large incidence angle range may be recorded, so that with an arrangement of a plurality of retroreflector/sensor pairs it is possible to achieve improved coverage of the overall field of view, in particular with overlaps in the edge regions, or a smaller number of such pairs is required.

The sensor arrangement furthermore comprises a code element having a code pattern. The code element is, for example, configured as a photomask and comprises defined regions for the transmission of electromagnetic radiation. The rest of the surface of the element may in this case be coated so as to be opaque to light, in particular for the wavelength of measurement laser radiation of a total station.

The retroreflector, the code element and the sensor are (rigidly) arranged in such a way that the code element is arranged between the retroreflector and the sensor and an angle-dependent position with respect to the optical axis of a projection of the code pattern onto the detection surface can be determined by means of the sensor.

The imaging of a specific code onto the sensor provides a very accurate possibility for evaluation of a position of the projection. The projection location on the sensor may, for example, be determined highly accurately by means of image processing. In this way, there is correspondingly high accuracy for the determination of the angle of incidence.

The sensor is in particular, arranged at a particular distance relative to the code element in order to provide the incidence angle-dependent projection. To this end, a specific spacer may be provided between the two components. The sensor arrangement may thus comprise a separating piece (spacer) which is arranged between the code element and the sensor, in which case the separating piece may furthermore be configured as a bandpass filter or as a longpass filter. A longpass filter may, in particular, provide a desired bandpass filter function in conjunction with a shortpass filter property (cutoff) of a silicon sensor.

In one embodiment, the reflector arrangement may comprise a control unit having a recording functionality, the recording functionality being configured for position-resolved detection of the measurement radiation by means of multiple readout of the sensor. In this case at least a first readout is carried out with measurement information relating to measurement radiation striking the detection surface and a second readout is carried out without this measurement information, in particular with the first and second readouts being carried out synchronized with switching emission of the measurement radiation on and off. From the recorded measurement data, differential information may be derived, from which for example background or ambient light jointly recorded with the laser radiation is cleaned.

Image recording by means of the sensor may thus, for example, be carried out in the form of alternating image recording alternately with and without incoming laser radiation. To this end, the laser light emission is switched on and off in a controlled way by the surveying apparatus (for example the total station). As a result, a differential image may be produced, which is cleaned in respect of the ambient light recorded with the laser switched off, i.e. image information obtained with the laser switched off may be subtracted from the image information with the laser switched on.

The image recording is, in particular, furthermore synchronized in one of the following ways with the switching of the laser on the measuring apparatus:

- a surveying apparatus (for example a total station) may emit a trigger signal via radio, WLAN, Bluetooth, a current mobile radio standard, etc. in real-time or with a predefined time offset, for example a few microseconds or milliseconds in advance. The signal is recorded by the reflector arrangement and processed for the purpose of the synchronized image recording, in particular while taking the time offset into account.
- Internal clocks both of the surveying apparatus and of the reflector arrangement are synchronized beforehand. Synchronism between the image recording and the light emission may thus be determined with the aid of the respective time. The sensor may then be driven accordingly with the aid of this information. By means of a hardware-supported NTP (Network Time Protocol), very accurate synchronization may be achieved.
- As an alternative, the sensor may run asynchronously, i.e. images may for example be recorded with a frame rate higher than switching of the laser on and off is carried out. The synchronization may then be determined with the aid of the images. In this case, the frequency is known but the phase must be calculated, for example by means of IQ demodulation (determination of a temporal correlation by sin( ) and cos( ) for each pixel or for groups of pixels.
- As an alternative, either the laser switches with each image (for example an on and off switching cycle at 50 Hz and synchronous image recording at 100 Hz) or the laser switches more slowly (for example at 10 Hz) and a plurality of images are recorded per on or off switching phase.

In connection with the image recording, a plurality of recorded images may be averaged in order to reduce noise in the image information.

The image sensor may, in particular, be operated in binned mode (a plurality of pixels are summed or averaged in analog and read out with a higher frame rate). This reduces noise in two respects: spatially (less noise per pixel in binned mode) and temporally because of the higher frame rate.

In one embodiment, only a subregion (region of interest) of the image sensor may deliberately be read out (for example only some of the light points generated) in order to save on CPU power and battery power and/or in order to increase the frame rate. The position of the subregion on the sensor is, in particular, adapted in real-time (for example by means of locally resolved intensity monitoring or by means of image processing) in order to provide recording of the projection on the sensor continuously.

On reception of a measurement signal, the reception may be confirmed to the surveying apparatus by means of a communication link, and identification information for the targeted target (target ID) may in this case be transmitted. This is advantageous when there are a plurality of 360° prisms or reflector arrangements in the range of the surveying apparatus, in order to avoid possible erroneous measurement to another reflector arrangement.

The emission of a scanning search beam of the surveying apparatus for rapid finding of retroreflectors in the measurement space may also be confirmed by means of the reflector arrangement as soon as the emitted search radiation (for example in a fan shape) is recorded in the reflector arrangement by the detector.

Besides the orientation determination, the reflector arrangement may thus also be used for searching (power search). Furthermore, the reflector arrangement may provide the sending of self-identification (target ID).

As an alternative or in addition, such a separating piece may be arranged between the passage surface and the code element.

In one embodiment, the retroreflector may be configured as a prism, in particular a triple prism, in particular mirrored, the prism comprising a light entry surface, for example forming a triangle and, as an aperture, the passage surface opposite the light entry surface.

In particular, the passage surface may be formed at one corner of the prism, in particular with the passage surface being formed by a recessed corner of the prism and likewise defining a triangle. The recess of the corner may, for example, be provided by polishing down or cutting off the corner. A part of the radiation entering the prism may leave the prism unreflected on its rear side through the passage surface.

The light entry surface and the passage surface are, in particular, not parallel but the light entry surface is oblique or transverse with respect to the passage surface.

The optical axis of the sensor may essentially be oriented orthogonally or at a particular angle obliquely with respect to the passage surface. This may be particularly advantageous in an embodiment in which there is an air gap between the prism and the code element and/or between the code element and the sensor. By adaptation of the angle, total internal reflection may be avoided or reduced to a smaller region.

The passage surface of the retroreflector is correspondingly preferably oriented parallel to the detection surface of the sensor. A light entry surface of the retroreflector is, in particular, oriented obliquely with respect to the detection surface so that an included angle is defined by the light entry surface and the detection surface.

According to one embodiment according to some aspects of the invention, the reflector arrangement may be configured as a 360° retroreflector having a multiplicity, in particular having six or eight, retroreflector/sensor arrangement pairs each having a retroreflector and a sensor arrangement. The multiplicity of retroreflectors are in this case arranged next to one another and are configured as prisms. Furthermore, the multiplicity of retroreflectors correspond numerically to the number of sensor arrangements, and each sensor arrangement is assigned to a retroreflector. The retroreflectors, the code elements and the sensors respectively assigned to one another are arranged according to the arrangement mentioned above.

In particular, the multiplicity of retroreflector/sensor arrangement pairs may be arranged annularly, and in particular form a ring, and the 360° retroreflector may define an overall azimuth field of view of 360°, each of the retroreflector/sensor arrangement pairs covering a part of the overall field of view. By the arrangement as a ring, a free space remains at the center of the ring, which remains usable for electrical contacting of the sensors, or of their printed circuit boards.

By the configuration as a 360° reflector, advantageous targetability may be provided from all azimuthal directions, and in contrast no specific orientation of the reflector arrangement about the vertical yaw axis is required in order to permit suitable targeting and therefore make it possible to carry out geodetic surveying.

The configuration of a 360° reflector may comprise a central axis A defined by the annular arrangement of the prisms orthogonally with respect to the optical axes of the sensors, the optical axes of at least two, in particular three prisms having a common point of intersection with the central axis A, the position of an optical axis of a prism being defined by the respective midpoints of its light entry surface and of its passage surface.

In another embodiment, the midpoints of the passage surfaces of the prisms of a first prism group of three prisms may lie in a first plane and the midpoints of the passage surfaces of the prisms of a second prism group of three prisms may lie in a second plane. The prisms are therefore offset in respect of their position along the central axis A. In particular, respectively neighboring prisms are offset correspondingly in their position, in particular alternatingly.

The first plane and the second plane are, in particular, oriented parallel to one another and have a particular spacing, in particular with the planes lying essentially orthogonally with respect to the central axis.

According to one embodiment, the code element may be configured as a photomask and in particular connected, in particular by adhesive bonding or vapor deposition, to the passage surface of the retroreflector. The code pattern may be provided by one or more light transmission regions provided by the photomask. A photomask is in this case intended, in particular, to mean a surface element which is at least partially opaque to light. The opacity to light (for example due to reflection or absorption) exists at least for a wavelength range around the wavelength of the measurement radiation. The photomask may, for example, be formed by a vapor-deposited thin film or an alternative application (for example onto a substrate such as a glass plate or the passage surface of the prism).

In particular, the photomask may comprise a multiplicity of randomly, in particular pseudorandomly arranged light-transmitting gaps, for example small circular surfaces, and the code pattern may be provided by said gaps. The light transmission provided relates, in particular, to a (narrow) wavelength range around the wavelength of measurement radiation which can be emitted by a geodetic surveying apparatus. The gaps are, in particular, distributed in a deliberate and known arrangement on the photomask.

The sensor may preferably be configured as a monochromatic BSI sensor (backside illumination sensor, cf. FIG. 2), in particular as a rolling-shutter sensor.

The reflector arrangement may provide a field of view with an elevation recording angle of at least ±30° and up to ±60°. The total recording angle may accordingly lie between 60° and 120°.

The azimuthal range of view may in total likewise be at least 60° (per prism). The azimuthal range of view in this case corresponds to a correspondingly recordable yaw angle range.

In one embodiment, the sensor is configured to record an image of the projection of the code pattern onto the detection surface, and the position of the code pattern projectable angle-dependently onto the detection surface may become determinable by means of image processing of the image. With the aid of the position determinable in this way, it is possible to determine an angle of incidence of the measurement radiation into the reflector, and therefore the orientation of the reflector relative to an emission direction (propagation axis) of the measurement radiation.

In particular, the reflector arrangement may comprise an evaluation unit, which is adapted to derive a spatial orientation of the reflector arrangement relative to a propagation axis of the radiation entering the retroreflector with respect to at least one degree of freedom with the aid of the position of the projection on the detection surface. In particular, a yaw angle relative to the propagation axis may in this case be determined, in particular by means of continuous recording of the position of the projection.

Some aspects of the invention furthermore relate to a measuring aid instrument, in particular a plumb rod, surveying rod or sensing tool, having a reflector arrangement according to an above-described embodiment. The measuring aid instrument is configured for contactless or tactile recording of a target point on an object with a defined position reference in relation to the reflector arrangement. By means of the reflector arrangement, the position and orientation of the measuring aid instrument can be determined uniquely in up to six degrees of freedom. The reflector arrangement is, in particular, in this case also used for determining the azimuth relative to the line of sight between the surveying apparatus and the measuring aid instrument.

By the provision of a sensor on the measuring rod and the recording of characteristic radiation of a total station, etc., the measuring rod may be configured as an active aid. To this end, the measuring rod may comprise an emitter unit and be configured in order to send information. For example, the measuring rod may generate a signal as a response to detection of a search beam, and thereby report to the total station that the radiation is striking the reflector (search process for finding a geodetic target).

Furthermore, it is possible that an ID of the particular target may be transmitted and thereby display which target has been found or is currently being targeted.

In the other direction, information may also be transmitted to the measuring rod. To this end, no additional receiver is required on the part of the rod, but instead the information may be transported by means of modulated electromagnetic radiation and recorded by the sensor.

Furthermore, the sensor in the reflector arrangement may also be configured for general image recording, besides the recording of the measurement radiation. The recording and evaluation of images of the surroundings may, for example, contribute to the position and placement determination of the measuring rod.

The impingement position and the orientation of the projection on the detection surface of the sensor correlate with the angle of incidence into the reflector arrangement.

With the aid of a calibration of the sensor, an angle of incidence may be determined by means of the determined impingement position. To this end, for example, a look-up table or a function expressing the correlation may be employed.

The sensor may furthermore be preceded by a filter. This filter may be wavelength-selectively configured and adapted in such a way that measurement radiation of a geodetic surveying apparatus reaches the sensor, but perturbing radiation from the surroundings or stray reflections are filtered out (for example reflected and/or absorbed). The filter may be configured as a spacer.

BRIEF DESCRIPTION OF THE DRAWINGS

The device according to the invention will be described in more detail below purely by way of example with the aid of specific exemplary embodiments schematically represented in the drawings, further advantages of the invention also being discussed. In detail.

DETAILED DESCRIPTION

Figure 1:
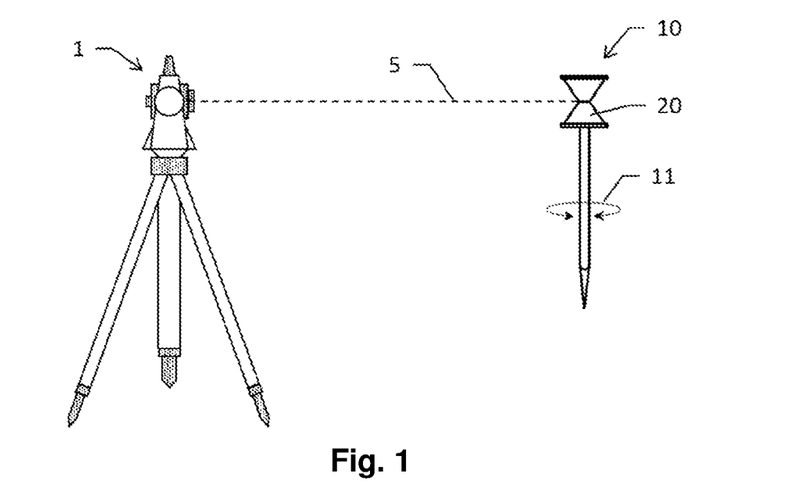
FIG. 1 shows a geodetic surveying system having a reflector arrangement according to the invention.

FIG. 1 shows a surveying apparatus 1, in particular configured as a total station or multistation, having a base, a stand, which can be swiveled relative to the base about a swivel axis, and a targeting unit which can be swiveled about two axes—swivel axis and tilt axis. A measurement laser beam 5 is emitted from the targeting unit and strikes a reflector arrangement 20 according to the invention of a measuring aid instrument configured as a plumb rod 10. Typically, (collimated) laser radiation, which can be generated by a laser diode provided on the surveying apparatus 1, is used as the measurement radiation 5. The reflector arrangement 20 has a retroreflector and a sensor arrangement.

For range measurement, the measurement radiation 5 is reflected back parallel by the retroreflector, recorded by the surveying apparatus 1 and evaluated in respect of distance information, for example by means of a time-of-flight measurement. The position of the measuring aid instrument 10 may be determined with the aid of the determination of the angular setting of the targeting unit, i.e. the emission direction of the laser 5.

For orientation determination of the measuring aid instrument 10, at least with respect to a rotational degree of freedom 11, in particular yaw, according to the invention a part of the radiation 5 which strikes the reflector arrangement 20 and is not reflected passes through the retroreflector and illuminates a code element, for example a photomask. A code pattern provided by the code element is thereby projected onto an optically downstream sensor, in particular an image sensor. The sensor is configured for recording an image of the projection generated in this way. The code pattern can therefore be recorded in an image, a position of the projection in the image, and by deduction a position of the projection on the sensor, or on the detection surface of the sensor, being determinable by means of image processing.

Since the position of the projection on the sensor is correlated with the angle of incidence because of the rigid arrangement of the sensor arrangement relative to the retroreflector, a direction angle for at least one degree of freedom in relation to the emission direction of the measurement radiation 5 may be determined from the determined position of the projection. Orientation determination of the measuring aid instrument 10 relative to the surveying apparatus 1 is therefore made possible at least in parts.

During surveying, the spatial position and the orientation of the surveying apparatus 1 are typically known. Thus, an absolute orientation of the measuring rod 10 in space, i.e. in the coordinate system in which the surveying apparatus 1 is calibrated, may be determined.

Figure 2:
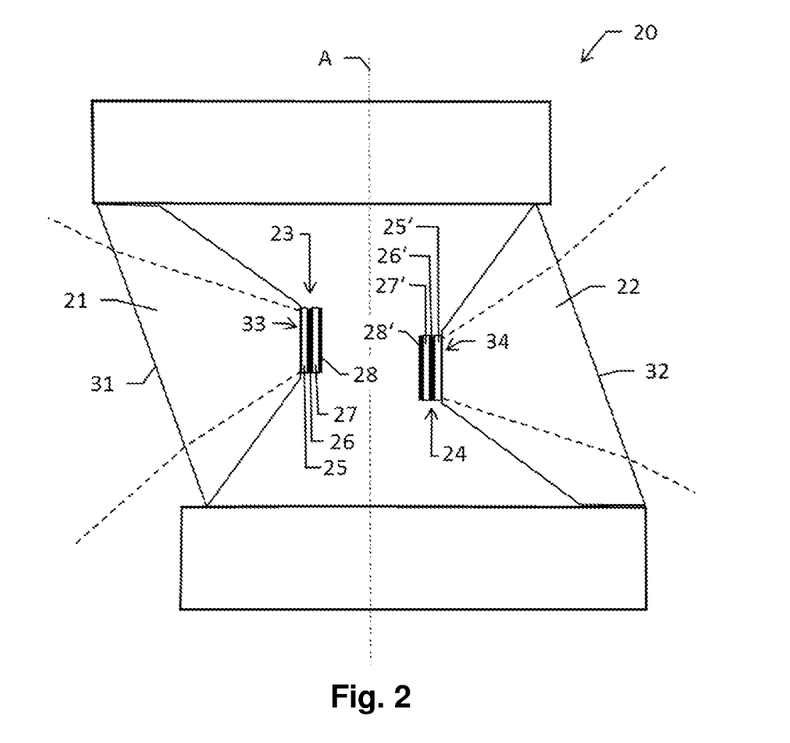
FIG. 2 shows an embodiment of a reflector arrangement according to the invention in cross section.

FIG. 2 shows an embodiment of a reflector arrangement 20 according to the invention in longitudinal cross section through its center.

The reflector arrangement 20 is configured as a 360° retroreflector and therefore provides a back-reflection of measurement radiation over an azimuthal range of 360°. The reflector arrangement 20 comprises six individual triple prisms, which give a total reflection range of 360° by their relative annular arrangement. In FIG. 2, two mutually opposite prisms 21 and 22 are shown representative of the total of six prisms, likewise in cross section. Each of the prisms is combined according to the invention with a respective sensor arrangement of which two sensor arrangements 23, 24 of the total of six sensor arrangements provided are likewise shown representative in the representation selected.

In this embodiment, each sensor arrangement 23, 24 comprises a first spacer 25, 25', functioning as a bandpass filter, which is connected to the respective passage surface 33, 34 of the respective prism 21, 22. The first spacer 25, 25' may, in particular, in this case be configured as a longpass filter (bandpass filter) consisting of an absorbent glass (for example RG 630 from the company Schott) in combination with a dielectric interference coating on the prism site, and thus functions like a bandpass filter for the desired measurement wavelength. It is to be understood that the invention generally also relates to embodiments without a long- or bandpass filter.

The bandpass filter may, for example, be configured for a relatively narrow filter range of for example, at most 50 nm to 10 nm, in order to provide optimized suppression of perturbing ambient light. In this way, the signal-to-noise ratio (SNR) may also be increased (for example up to 10.5). As a result, the accuracy of orientation determination may be improved further, so that a possible error for the orientation determination is 0.38 mrad.

The respective first spacer 25, 25' is in each case followed by a code element 26, 26'. The code element 26, 26' is, in particular, configured to be semitransparent in relation to the wavelength of measurement radiation which can be emitted by a total station, i.e. the code element 26, 26' comprises regions which are transparent for the measurement radiation and other regions which are opaque, for example reflective or absorbent, for the measurement radiation. For example, the regions which are transparent to light thus define the respective code pattern of the code elements 26, 26'. It is to be understood that the respective code pattern may conversely be formed by the nontransparent parts of the code, i.e. as a corresponding negative. The code patterns of the individual code elements 26, 26' may be different.

Figure 3A:
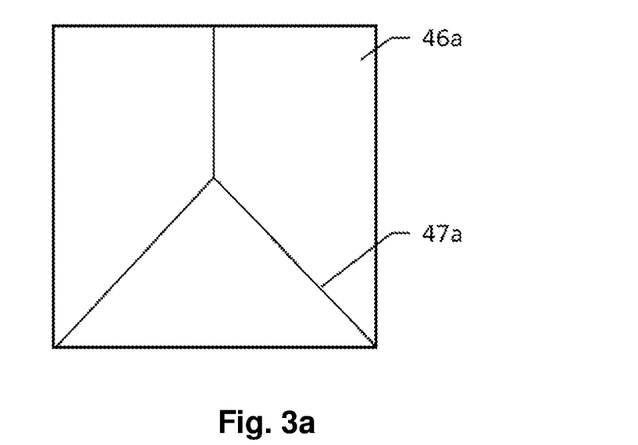
FIGS. 3a-b show a respective code element which may be used according to the invention.
Figure 3B:
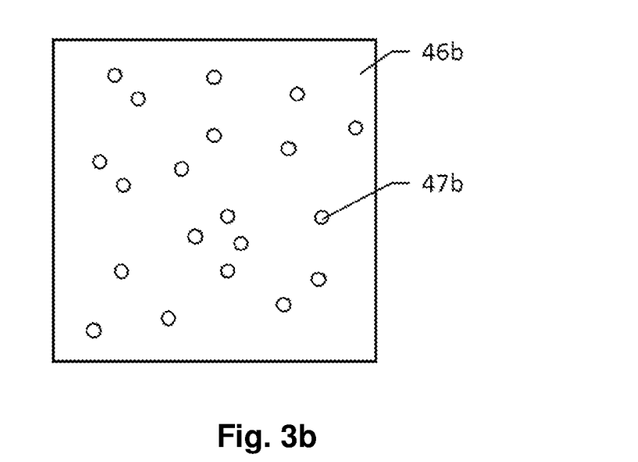

The code pattern may for example be configured as a circle, in the form of lines (for example parallel in the manner of a barcode) or a cross (cf. FIGS. 3a and 3b). A code pattern with parallel lines may be advantageous particularly when using a 1D linear sensor. Such a combination may have an increased frame rate and an improved signal-tonoise ratio. The measurement speed achievable in this way may be higher than with a surface sensor. In this way, real-time tracking may advantageously be achieved.

The sensor arrangements 23, 24 furthermore each comprise a sensor 28, 28', a respective second spacer 27, 27', for example a glass body, in particular made of borosilicate crown glass, being arranged between the sensor 28, 28' and the code element 26, 26'.

Between the code element 26, 26' and the downstream sensor 28, 28', diffraction may furthermore occur. The code pattern may be adapted so that the diffraction is focused and, for example, a round hole with a correspondingly adapted diameter produces optimal projection on the sensor, i.e. maximally sharp imaging on the sensor. This may also be achieved by means of a small Fresnel lens or a zone plate. As an alternative, for example, a diffractive pattern which generates a cross, etc., on the sensor may also be selected.

On their outwardly facing end sides, the prisms 21, 22 respectively comprise light entry surfaces 31, 32 and respectively opposite, in the direction of the center of the arrangement, the passage surfaces 33, 34. In order to form such a light passage surface 33, 34, in the case of a triangular prism 21, 22, the triple corner on the optical axis may for example be removed (for example cut off, ground down, polished away).

An overall field of view resulting from the arrangement shown, i.e. over an azimuthal angle range of 360°, continuously provides a viewing angle (elevation) of at least ±15° in the elevation direction (orthogonally to the azimuth; total aperture angle of at least 30°).

In particular, according to one particular embodiment, at least essentially an elevation of ±30° or ±35° may be continuously imaged (i.e. an elevation field of view of 60° or 70°).

This reflector arrangement 20 of a 360° reflector also has the advantage that the optical axes of the sensors are at least essentially coaxial or parallel with the optical axes of the prisms. The measurement radiation of the distance measuring unit of a total station may therefore simultaneously be used for the orientation determination of the reflector arrangement 20 or of a pole carrying this arrangement. Furthermore, the sensor arrangement is fully integrated into the reflector and not visible from the outside. The reflector arrangement 20 is therefore very compactly configured. Another advantage is the very good insulation thereby obtained against environmental influences (for example moisture, dust) from the outside. The total weight increase of the arrangement remains relatively low because of the provision of the integrated components.

As shown in FIG. 2, respectively opposite prisms 21, 22 are on the one hand offset in relation to their positioning along the central axis A, and on the other hand the angle between the passage surface 33 and the entry surface 31 of the first prism 21 and the passage surface 34 and the entry surface 32 of the second prism 22 are preferably identical in magnitude but opposite in relation to the direction. In the exemplary embodiment shown, respectively neighboring prisms are correspondingly oriented differently.

Because of this offset arrangement—three prisms inclined upward and three inclined downward—three of the sensor arrangements lie in a first plane and three further sensor arrangements lie in a second plane, the planes being oriented parallel to one another and preferably orthogonal with respect to the central axis A.

The inner diameter of the (triangular) passage surface 33, 34 is preferably configured in such a way that it is larger than the detection surface of the sensor 28, 28'. In this way, the orientation determination can be provided even in the case of a large angle of incidence. The inner diameter of the passage surface 33, 34 may alternatively be selected to be smaller, so that on the one hand the detection range is reduced but the size of the prism vertex cut off is likewise smaller. This allows improved distance measurability in the case of small distances between the total station and the reflector.

The six sensors of this reflector arrangement 20 are wired inside the arrangement. The signals of the sensors, or the images recorded with the sensors, are transmitted to a processing unit which provides the calculation of the orientation. This processing unit may, for example, be provided in the reflector arrangement 20 or with the total station 1 (TPS). As a function thereof, raw data or already processed data may correspondingly be transmitted to the TPS.

In the case of directional illumination of the reflector arrangement 20, at least one of the prisms 21, 22 is thus illuminated as a function of the yaw state of the arrangement 20, i.e. as a function of the orientation of the arrangement 20 in relation to rotation about the vertical axis A relative to the beam source. The radiation enters the prism in question and is partially reflected back. An unreflected part of the radiation may pass through the corresponding passage surface 33, 34 and lead to projection, made possible by the code element 26, 26', of a code pattern onto the sensor 28, 28'. By identifying on which of the sensors 28, 28' more electromagnetic radiation impinges, in a first step the sensor 28, 28'/reflector 21, 22 facing toward the beam source may be determined and an approximate yaw angle may be determined.

In a second step, a precise yaw angle may be calculated by evaluating the position of the code, projected onto the sensor, on the detection surface of the sensor 28, 28'.

For the evaluation (in particular as a function of the sensor type) for example an intensity observation may be carried out over the sensor surface. As an alternative or in addition, the image generatable by the sensor, which comprises the incident radiation imaged, may be evaluated by means of image processing. In this case, for example, brightness or contrast evaluations may be applied in order to derive the impingement position.

In an alternative embodiment (not shown), 360° azimuthal coverage may already be provided with an arrangement of four combined sets consisting of a prism and an assigned sensor arrangement.

The sensor 23, 24 may for example be configured as image sensors (CCD or CMOS), or as position-resolving detectors sensitive to the wavelength of the measurement radiation. The sensor 23, 24 is, in particular, of the rolling-shutter sensor type.

In one embodiment, the sensor may be configured as a BSI (backside illuminated) sensor. This sensor type has in particular an enlarged recordable angle range, so that a correspondingly advantageous size of a recordable field of view can be provided. Such a BSI sensor may be embodied as a rolling-shutter or as a global-shutter sensor.

The sensor may also be provided with a polarization matrix (for example Sony IMX250MZR). In this case, in a similar way to an RGB color matrix, there is a matrix consisting of for example 2×2 cells in front of the pixels, which allows polarization-sensitive detection of the received light. During the emission of polarized measurement radiation by the TPS, the roll angle may therefore be determined by means of polarization-sensitive detection on the measuring rod. Additional use of inclination sensors for full 6DOF orientation determination may therefore be obviated. With the image sensors behind the prisms, all rotational degrees of freedom of the measuring rod may thus be determined.

In other words, in one particular embodiment, the sensor may be configured as a polarization-resolving sensor, different, in particular neighboring, sensor pixels being assigned different polarization-sensitive matrix elements and the sensor providing a calculation of the Stokes vector with the aid of an intensity evaluation of the different sensor pixels.

The reflector arrangement 20 provides a determination of the spatial orientation particularly in relation to a yaw movement, i.e. a rotation of the reflector arrangement 20 about the central axis A. The other two rotational degrees of freedom, roll and pitch angle, may for example be determined by means of a gravitation inclination meter or (partially) likewise with the aid of the reflector arrangement 20. In order to determine the orientation in all three rotational degrees of freedom, the measurement data recorded for this purpose are preferably processed together. If, for example, the roll and pitch positions are determined by means of an inclination sensor, the azimuthal orientation of the measuring rod with respect to the total station may be calculated uniquely.

The orientation determination with the reflector arrangement 20 is carried out with the aid of and relative to the propagation axis of the measurement radiation striking the arrangement 20, for example emitted by a total station.

Because of the configuration of the reflector arrangement 20, the resulting projection on the sensor correlates with the angle of incidence of the radiation into the prism. The azimuth of the reflector arrangement 20 in relation to the propagation axis of the measurement radiation may therefore be derived with the aid of the determined position of the projection.

If, while measurement radiation is incident, the reflector arrangement 20 is rotated about the axis A, the position of the projection on the sensor varies. If the measurement radiation in this case leaves the field of view of one prism and enters the field of view of a neighboring prism, the measurement radiation no longer strikes the previous sensor but is directed onto the neighboring sensor.

According to the invention, the evaluation of the orientation may alternatively be carried out not only with the aid of an image, but rather continuous monitoring of the position of the projection may be carried out and an orientation may be deduced by a respective change in the position of the projection (likewise continuously).

The measurement of the yaw is fixed to the apparatus, i.e. the measurement is carried out relative to the pole axis. For example, an inclination sensor (inclinometer) measures relative to gravity. If a measuring rod is thus at least essentially placed vertically, a yaw correspondingly takes place parallel to the azimuth and/or all three spatial angles can be determined simply. The greater the deviation of the position of the measurement rod from a vertical orientation, the lower the resulting measurement accuracy, but the system according to the invention allows reliable and complete spatial orientation determination (with an additional inclination sensor) at least up to an inclination of the measuring rod of 70° or 80°.

FIG. 3 show respective embodiments of code elements 46a and 46b which may be used according to the invention. The code elements 46a, 46b are configured as photomasks which are for the most part opaque to light over their surface.

The code element 46a provides a code pattern in the form of a three-branched cross 47a. The regions on the photoplate which form the cross 47a are not coated to this end so as to be opaque to light but are configured to be (angle-dependently) transparent to light at least for the illuminating measurement radiation.

If the code element 46a is correspondingly illuminated, the cross 47a is projected onto the sensor. With the sensor, an image representing this projection may be generated. By image processing, with the aid of the image, a position of the cross 47a in the image and therefore on the sensor may be determined. Because of the incidence angle correlation, this position in turn allows direct deduction of the angle of incidence of the illumination radiation, so that the orientation of the reflector arrangement relative to the propagation direction of the illumination radiation can be determined in at least one or two degrees of freedom.

FIG. 3b shows a code element 46b having a code pattern with a random arrangement of small regions 47b transparent to light (gaps). In the example shown, these regions 47b are configured as so-called pinholes, i.e. in the form of small transparent holes which are preferably formed by corresponding gaps of a radiation-opaque coating of the code element. The holes 47b are distributed randomly or pseudorandomly on the surface of the code element 46b. The positions of the holes 47b, i.e. their relative arrangement, are however known for evaluation of a projection thereby generatable.

The number of pinholes 47b need not in this case be excessively large, and a relatively small number is enough to achieve sufficient redundancy, for example under the effect of undesired solar radiation on the evaluation.

The number of holes 47b transparent to light may be between 10 and 30. Typically, the projection of at least four of the holes still remains readily evaluable even under strong perturbing influences. The diameter of such a hole 47b is in this case preferably selected from a range of from 50 µm to 150 µm.

Perturbations due to fouling on the outer side of a prism may, for example, lead to irregular brightness distribution of the imaged pinhole on the sensor and are therefore an indication of possible incorrect determination of the intensity centroids. In this case relatively dark pinholes may also be excluded in the evaluation of an image recorded by the sensor, or of the sensor signals, in order to increase the accuracy of the measurement.

Since an entire code pattern may be analyzed during the evaluation, the robustness of such a redundant code pattern is increased significantly compared with a single pinhole. In a solution with only one aperture or a single pinhole, there is the disadvantage of erroneous or unreliable signal evaluation even in the event of slight and/or partial fouling of this light passage.

If, for example, by global perturbation of all the pinholes the distances of the imaged pinholes from one another are greatly perturbed, which may be identified by a comparison with the expected distances and distributions of the known pattern, this may be made known to the user in a perturbation message (for example a cleaning request). Incorrect measurements may thus be avoided.

The approach according to the invention with the use of a code pattern therefore allows self-analysis of the measurement means capability. If the correlation with the stored code pattern (for example, a kind of look-up table) is insufficient, for example because of different brightnesses of the spots or an inconsistency in the relative distances, the measurement may be categorized as insufficiently reliable.

Should the available measurement capability fall below a threshold value, for example during heavy rain, the user may be requested to discard the measurement entirely. The user may then, for example, correspondingly set the measuring rod upright by means of a leveling instrument. The advantage of the approach according to the invention is that the user may be informed separately from the measurement result and unnoticed incorrect measurements may thus be avoided.

It is to be understood that these represented figures only schematically represent possible exemplary embodiments. The various approaches may according to the invention likewise be combined with one another and combined with geodetic surveying systems of the prior art.

What is claimed is:

1. A reflector arrangement for position determination or marking target points, the reflector arrangement comprising:
    at least one retroreflector, which
        provides position determination for the reflector arrangement by means of parallel measurement beam reflection, and
        provides a passage surface for at least a part of measurement radiation entering the retroreflector, and
    at least one sensor arrangement, arranged downstream of the retroreflector in relation to a measurement beam incidence direction, the sensor arrangement having a sensor for recording measurement radiation passing through the passage surface, the sensor defining an optical axis oriented orthogonally with respect to its detection surface,
    wherein:
    the sensor arrangement includes a code element having a code pattern, and
    the retroreflector, the code element, and the sensor being arranged such that:
        the code element is arranged between the retroreflector and the sensor, and
        an angle-dependent position with respect to the optical axis of a projection of the code pattern onto the detection surface can be determined by means of the sensor,
        wherein the retroreflector is configured as a prism, and the prism comprises:
            a light entry surface forming a triangle and,
            as an aperture, the passage surface opposite the light entry surface,
        wherein the reflector arrangement is configured as a 360° retroreflector having a multiplicity of retroreflector and sensor arrangement pairs, each having a retroreflector and a sensor arrangement as specified above, with
            the multiplicity of retroreflectors being arranged next to one another and being configured as prisms,
            the multiplicity of retroreflectors numerically corresponding to the number of sensor arrangements, and
            each sensor arrangement being assigned to a retroreflector,
        wherein:
            the multiplicity of retroreflector and sensor arrangement pairs are arranged annularly, and
            the 360° retroreflector defines an overall azimuth field of view of 360°, each of the retroreflector and sensor arrangement pairs covering a part of the overall field of view,
        wherein:
            a central axis A defined by the annular arrangement of the prisms extends orthogonally with respect to the optical axes of the sensors, and
            the optical axes of at least two prisms have a common point of intersection with the central axis A, the position of an optical axis of a prism being defined by the respective midpoints of its light entry surface and of its passage surface.

2. The reflector arrangement according to claim 1, wherein:
    the code element is configured as a photomask and is connected to the passage surface of the retroreflector, and
    the code pattern is provided by one or more light transmission regions provided by the photomask.

3. The reflector arrangement according to claim 2, wherein the photomask comprises a multiplicity of randomly arranged light-transmitting gaps, and the code pattern is provided by said gaps.

4. The reflector arrangement according to claim 1, wherein the sensor arrangement comprises a separating piece, which is arranged between the code element and the sensor or between the passage surface and the code element, the separating piece being configured as a bandpass filter or as a longpass filter.

5. The reflector arrangement according to claim 1, wherein the reflector arrangement provides a field of view with an elevation recording angle of at least ±30° and up to ±60°.

6. The reflector arrangement according to claim 1, wherein:
    the sensor is configured to record an image of the projection of the code pattern onto the detection surface, and
    the position of the code pattern projectable angle-dependently onto the detection surface can be determined by means of image processing of the image.

7. The reflector arrangement according to claim 1, wherein the reflector arrangement comprises an evaluation unit, which is adapted to derive a spatial orientation of the reflector arrangement relative to a propagation axis of the radiation entering the retroreflector with respect to at least one degree of freedom with the aid of the position of the projection on the detection surface.

8. The reflector arrangement according to claim 1, wherein:
    the sensor is configured as a monochromatic BSI sensor, or
    the sensor is configured as a polarization-resolving sensor, with
        different sensor pixels being assigned differently polarization-sensitive matrix elements, and
        the sensor providing a calculation of the Stokes vector with the aid of an intensity evaluation of the different sensor pixels.

9. The reflector arrangement according to claim 1, wherein the reflector arrangement comprises a control unit having a recording functionality, the recording functionality being configured for position-resolved detection of the orientation measurement radiation by means of multiple readout of the sensor, at least a first readout being carried out with measurement information relating to orientation measurement radiation striking the detection surface and a second readout being carried out without this measurement information.

10. A measuring aid instrument having a reflector arrangement according to claim 1, the measuring aid instrument being configured for contactless or tactile recording of a target point on an object with a defined position reference in relation to the reflector arrangement.

11. A reflector arrangement for position determination or marking target points, the reflector arrangement comprising:
at least one retroreflector, which
provides position determination for the reflector arrangement by means of parallel measurement beam reflection, and
provides a passage surface for at least a part of measurement radiation entering the retroreflector, and
at least one sensor arrangement, arranged downstream of the retroreflector in relation to a measurement beam incidence direction, the sensor arrangement having a sensor for recording measurement radiation passing through the passage surface, the sensor defining an optical axis oriented orthogonally with respect to its detection surface,
wherein:
the sensor arrangement includes a code element having a code pattern, and
the retroreflector, the code element, and the sensor being arranged such that:
the code element is arranged between the retroreflector and the sensor, and
an angle-dependent position with respect to the optical axis of a projection of the code pattern onto the detection surface can be determined by means of the sensor,
wherein the retroreflector is configured as a prism, and the prism comprises:
a light entry surface forming a triangle and, as an aperture, the passage surface opposite the light entry surface,
wherein the reflector arrangement is configured as a 360° retroreflector having a multiplicity of retroreflector and sensor arrangement pairs, each having a retroreflector and a sensor arrangement as specified above, with
the multiplicity of retroreflectors being arranged next to one another and being configured as prisms,
the multiplicity of retroreflectors numerically corresponding to the number of sensor arrangements, and
each sensor arrangement being assigned to a retroreflector,
wherein
the midpoints of the passage surfaces of the prisms of a first prism group of three prisms lie in a first plane and the midpoints of the passage surfaces of the prisms of a second prism group of three prisms lie in a second plane, and
the first plane and the second plane are oriented parallel to one another.

12. A measuring aid instrument having a reflector arrangement according to claim 11, the measuring aid instrument being configured for contactless or tactile recording of a target point on an object with a defined position reference in relation to the reflector arrangement.

* * * * *